Figure 1:
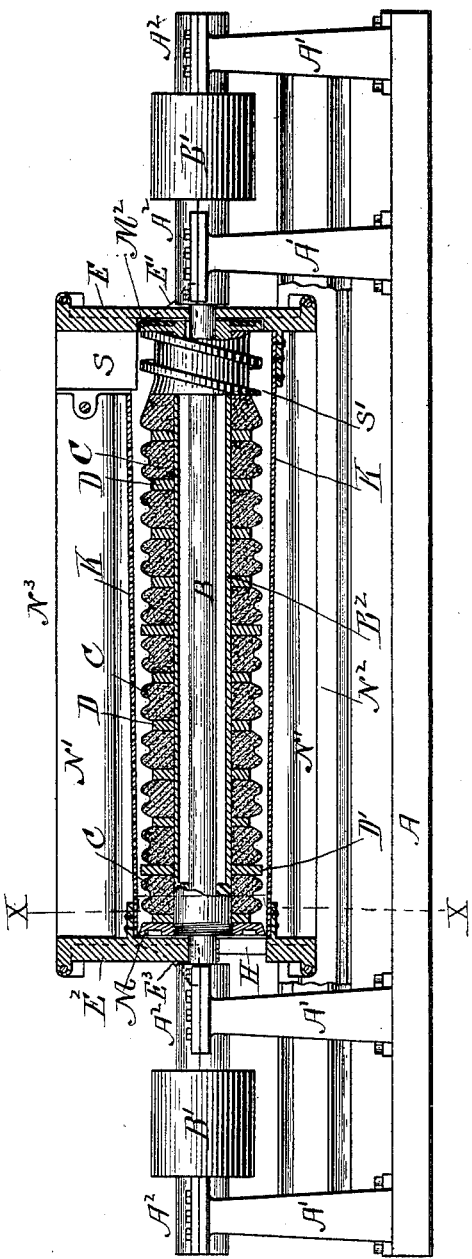

No. 659,840. Patented Oct. 16, 1900.
W. C. BAXTER.
COTTON SEED DELINTER.
(Application filed Dec. 8, 1898.)
(No Model.) 3 Sheets—Sheet 1.

WITNESSES
Frank G. Parker
Frank J. Hattie

INVENTOR
William C. Baxter

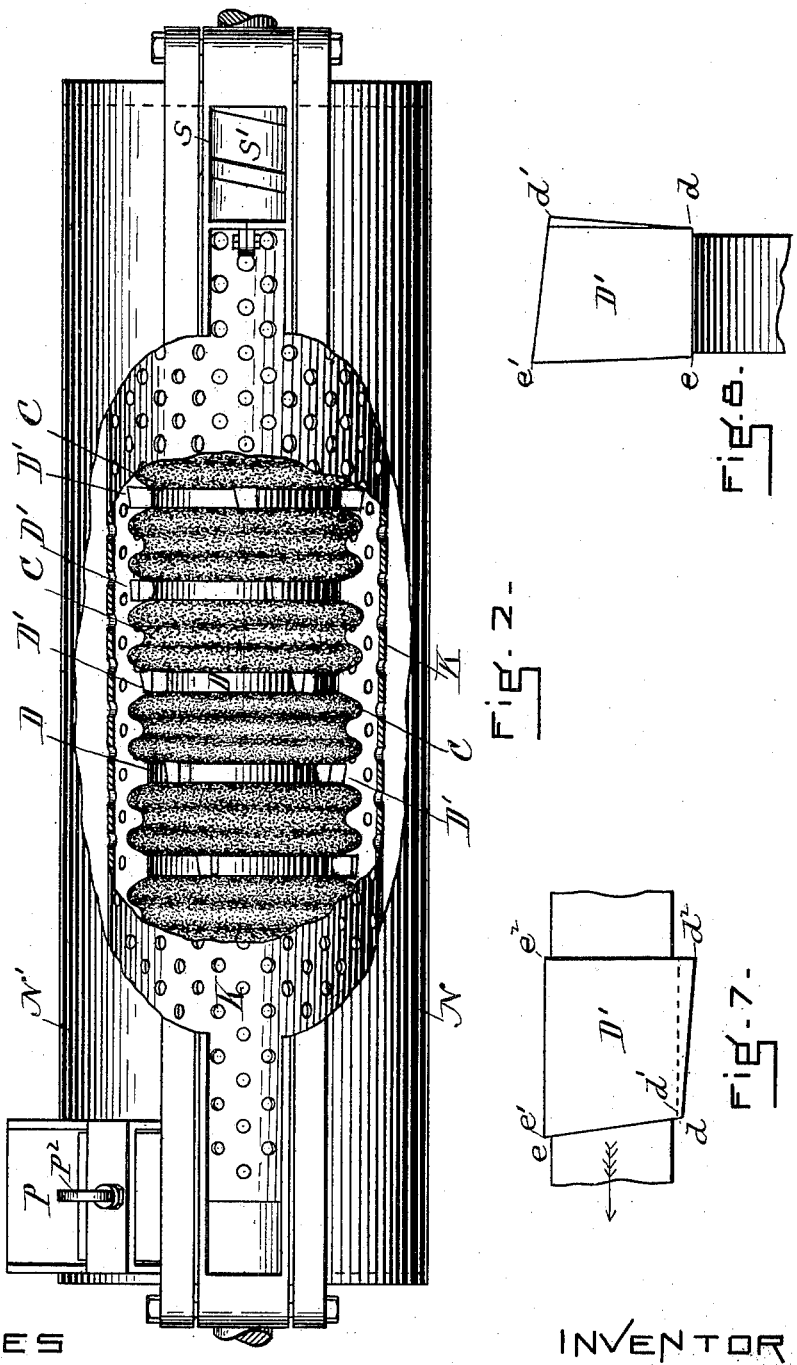

No. 659,840. W. C. BAXTER. Patented Oct. 16, 1900.
COTTON SEED DELINTER.
(Application filed Dec. 8, 1898.)
(No Model.) 3 Sheets—Sheet 3.
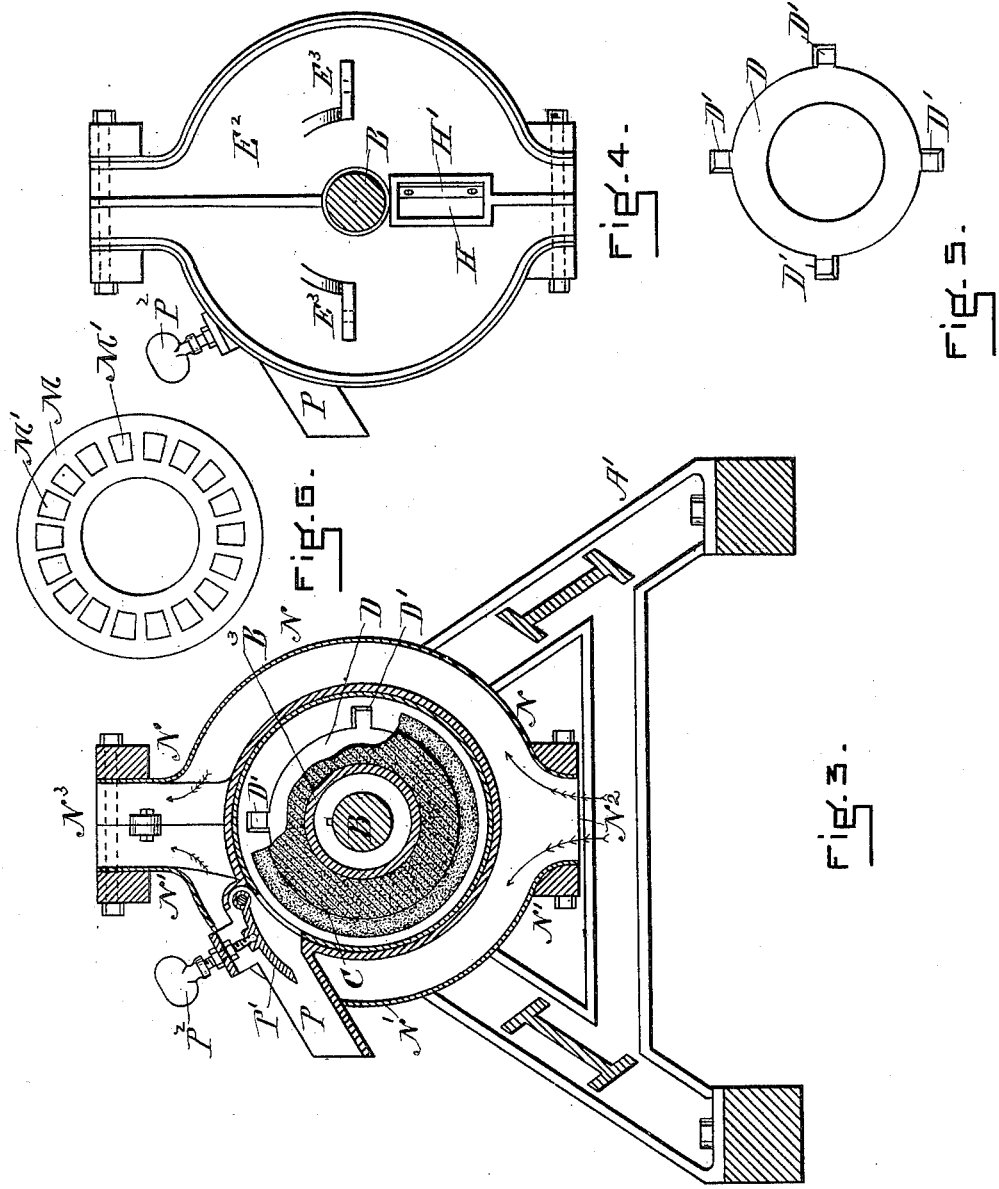
WITNESSES
Frank G. Parker
Frank G. Hathe
INVENTOR
William C. Baxter

UNITED STATES PATENT OFFICE.

WILLIAM C. BAXTER, OF EAST BRIDGEWATER, MASSACHUSETTS, ASSIGNOR TO THE PLANTERS' COTTON COMPANY, OF VICKSBURG, MISSISSIPPI.

COTTON-SEED DELINTER.

SPECIFICATION forming part of Letters Patent No. 659,840, dated October 16, 1900.

Application filed December 8, 1898. Serial No. 698,666. (No model.)

*To all whom it may concern:*

Be it known that I, WILLIAM C. BAXTER, of East Bridgewater, in the county of Plymouth and State of Massachusetts, have invented a new and useful Improvement in Cotton-Seed Delinters, of which the following, taken in connection with the accompanying drawings, is a specification.

My invention relates to improvements in machines for removing the lint from cotton-seed; and it consists in devices by which a much better feeding action is attained, the practical working of the machine is improved, and there is no danger of the running parts becoming clogged.

My invention is illustrated in the accompanying drawings, in which—

Figure 1 shows the machine partly in elevation and partly in vertical section. Fig. 2 is a plan showing the essential features of my machine, a part being represented as broken out to show the interior construction. Fig. 3 is a vertical section taken on line X X, Fig. 1, enlarged. Fig. 4 shows in end elevation the cylindrical part of my machine; Figs. 5, 6, 7, and 8, details.

The framework of my machine is represented by A A' A². The main shaft B is mounted on bearings A² A² (see Fig. 1) and is driven by the belt-pulleys B' B'. A sleeve or hollow shaft B² is mounted upon the shaft B and is rigidly affixed to it. At each end of the sleeve B² a disk is attached, one, M² of these disks permanently fixed to the sleeve, but the other, M, is screwed on, as shown in Fig. 1.

C C are a series of abrading or grinding wheels mounted upon the sleeve B². These wheels C C are made of corundum wholly or in part and are more or less grooved circumferentially, as shown. Between each pair of the wheels C C, I place a metallic disk D, each of which has teeth or projections D' D'. These teeth are arranged spirally, as shown in Fig. 2, so that as they rotate they have a tendency to feed the cotton-seed along, as well as to act as stirrers and also to assist in removing the lint from the seed.

The teeth or, as I prefer to call them, "stirrers," D' D' are made in a peculiar form to adapt them to their work. This form is clearly shown in Figs. 7 and 8. In Fig. 7 a stirrer is shown in plan and in Fig. 8 in front elevation. The front face $d\ e\ e'\ d'$ is inclined, as indicated, so as to have a tendency to cause the seed to advance along the cylinder from the feed end to the discharge end. The side face (indicated by the line $d\ d^2$) is also inclined, so as to force the seed in the same direction. The top face $d'\ e'\ e^2\ d^2$ is also inclined, as indicated by the line $e'\ d'$, Fig. 8, for the same purpose. The front face of the stirrer being inclined, as shown, serves as it travels through the seed to force the seed primarily against the corundum rolls, from which it is forced outward against the inner surface of the perforated cylinder, so that the lint is rubbed or ground from it, and the position of each seed is constantly changed throughout the mass. At the same time the seed is packed in the mass with sufficient pressure to be so held against the grinding-roll that the lint will be ground away.

From the above it may be seen that the stirrers act to prevent the machine from clogging, to assist in the delinting operation, and to advance the seed from the feed end to the discharge end of the machine.

It will be observed that the corundum wheels C C and the disk D D constitute a delinting-drum mounted upon the shaft B, which is driven with great force and rapidity by the belt-pulleys B' B'.

A perforated cylinder K surrounds the working or delinting drum. This cylinder K is made conical, being smaller at the left-hand end than at the right—that is, it is larger at the end which receives the seed to be delinted (from the chute S) than at the end from which the denuded seed is delivered to the outlet P. This construction allows of a larger space between the drum and the interior of the perforated cylinder at the feed end than at the delivering end, which is highly desirable, especially in connection with the suction, as the seed when entering are covered with lint and require more space than when the lint has been taken off from them and they are about to pass out of the machine through the outlet P. This same result could be attained by making the diameter of the delinting-drum larger at the discharge end than it is at the feed end and by making the perforated cylinder K of the same diameter at each end. The perforations in the cylinder K are larger at the feed end than at the discharge end, for the reason that the lint is longer and requires larger orifices for escape than is required at or near the discharge end, when the seed-covering is of a much finer nature.

To assist in feeding, I have a worm S' attached to the shaft B at the discharge end of the chute S, so that as the seed covered with lint fall from the chute they are fed into the space between the delinting-drum and the cylinder K. As the process of delinting goes on the lint works out through the openings in the cylinder K and is carried off by a suction applied at $N^3$. In practice a hood or receiving-chamber is mounted at $N^3$ to receive the lint that is removed from the seed, the seed passing out through the chute P. For convenience I place an adjustable door or valve P' in the chute P, which may be operated by the screw $P^2$. By adjusting the valve P' the discharge of the denuded seed may be regulated—that is, the seed may be held back just enough to keep the space between the delinting-drum and the perforated cylinder well filled and in position to be acted upon.

The end pieces E and $E^2$ are solidly attached to the framework by the bracket-pieces E' and $E^3$. (See Fig. 1.) The cylinder K and the casing N N' are firmly fixed to said end pieces E and $E^2$.

To operate my machine, the seed covered with lint is placed in the chute S and falling upon the worm S' is fed along into the space between the delinting-drum and the perforated cylinder K and there acted upon, being carried around the said drum and gradually forced in a longitudinal direction toward the discharge-chute P. As the seed is forced along it is subjected to the abrading action of the corundum wheels C C and also to the action of the teeth or stirrers D' D' on the disks D D.

The end disks M $M^2$, Fig. 1, are provided with a series of recesses or pockets M' M', (see Fig. 6,) which are used for inserting lead for the purpose of balancing the delinting-drum.

To prevent the accumulation of dust, &c., between the end disk M and the headpiece $E^2$, I have an opening H in the headpiece $E^2$ and a scraper H'. This scraper H' bears against the face of the end disk M and rubs off the dust, forcing it out through the opening H.

I claim—

1. In a delinter, a rotating drum and a perforated cylinder surrounding it, said drum and cylinder being shaped with relation to each other as shown and described, whereby a chamber is formed surrounding said drum tapering in size from the inlet to the outlet, in combination with means for creating suction about said chamber, and feed and delivery devices, substantially as set forth.

2. In a delinter, a rotating drum, and a perforated cylinder surrounding it, the perforations in said cylinder being larger at the inlet than at the outlet, and said drum and cylinder being shaped with relation to each other as shown and described whereby a chamber is formed surrounding said drum and tapering in size from the inlet to the outlet, in combination with means for creating suction about said chamber, and feed and delivery devices, substantially as set forth.

3. In a delinter, a rotating drum and a perforated cylinder surrounding it, the parts being so proportioned that the seed-space between them decreases from the feed to the delivery end; combined with a chamber surrounding the cylinder, means for creating suction therein, and means for forcing the seed while in transit against said drum, substantially as and for the purpose set forth.

4. In a delinter, a horizontal rotating drum, and a perforated cylinder surrounding it and having its perforations decreasing in size from the feed toward the delivery end; combined with a chamber surrounding the cylinder, and means for creating a suction therein, substantially as and for the purpose set forth.

5. In a delinter, a rotating drum, and a cylinder surrounding the same and provided with perforations decreasing in size toward the delivery end, the parts being so proportioned that the seed-space between the drum and cylinder also decreases in size from the feed end toward the delivery end; combined with a chamber surrounding the cylinder, and means for creating a suction therein, substantially as and for the purpose set forth.

6. In a delinter a rotating delinting-drum, a fixed perforated cylinder surrounding said drum, a headpiece as $E^2$ having a dust-opening as H provided with a scraper adapted to remove dust from the end of the delinting-drum, substantially as and for the purpose set forth.

7. In a delinter, a delinting-drum consisting of a series of corundum wheels and disks having teeth, said teeth having the form of irregular hexahedrons the working faces of which are inclined to the line of their motion whereby they act as stirrers, rubbers and feeders, substantially as and for the purpose set forth.

8. In a delinter, a horizontal, self-feeding, delinting-drum inclosed in a perforated cylinder; and a seed-escape passage arranged tangentially to the said perforated cylinder; and a regulating-valve swinging upon an axis parallel to the axis of the said cylinder, and having its free end adjustably held; and mechanism for adjusting the said valve, substantially as and for the purpose set forth.

9. In a delinter, a rotating delinting-roll, consisting of a series of grinding-wheels, and a series of stirrers, each stirrer having one or more teeth, one or more faces of each tooth being inclined with relation to the axis of the roll, as described, and a perforated cylinder surrounding said roll, said roll and said cylinder being shaped with relation to each other, as shown, whereby a chamber is formed surrounding said roll and tapering in size from the inlet to the outlet, and the seed in process of delinting is forced during said process toward said outlet, in combination with feed and delivering devices, as set forth.

In testimony whereof I have signed my name to this specification, in the presence of two subscribing witnesses, on this 2d day of December, A. D. 1898.

WILLIAM C. BAXTER.

Witnesses:
FRANK G. PARKER,
FRANK G. HATTIE.